(12) United States Patent
Kubo et al.

(10) Patent No.: US 8,504,927 B2
(45) Date of Patent: Aug. 6, 2013

(54) E-MAIL PROCESSING APPARATUS, E-MAIL PROCESSING METHOD AND RECORDING MEDIUM

(75) Inventors: Hiroaki Kubo, Muko (JP); Kenji Matsuhara, Kawanishi (JP); Hironobu Nakata, Itami (JP); Toshihiko Otake, Nishinomiya (JP); Yoshiki Tokimoto, Nishiwaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 985 days.

(21) Appl. No.: 11/802,733

(22) Filed: May 24, 2007

(65) Prior Publication Data

US 2008/0052633 A1    Feb. 28, 2008

(30) Foreign Application Priority Data

Aug. 24, 2006  (JP) ................... 2006-228491

(51) Int. Cl.
*G06F 3/00* (2006.01)

(52) U.S. Cl.
USPC .......................................... 715/752; 715/853

(58) Field of Classification Search
USPC .................................................. 715/752, 853
See application file for complete search history.

(56) References Cited

U.S. PATENT DOCUMENTS

| 7,155,481 | B2 * | 12/2006 | Prahlad et al. | 709/206 |
| 7,363,590 | B2 * | 4/2008 | Kerr et al. | 715/759 |
| 2002/0029247 | A1 * | 3/2002 | Kawamoto | 709/206 |
| 2002/0065892 | A1 * | 5/2002 | Malik | 709/206 |
| 2002/0133557 | A1 * | 9/2002 | Winarski | 709/207 |
| 2003/0069892 | A1 * | 4/2003 | Hind et al. | 707/103 X |
| 2005/0015432 | A1 * | 1/2005 | Cohen | 709/201 |
| 2006/0036696 | A1 * | 2/2006 | Maresh | 709/206 |
| 2007/0174394 | A1 * | 7/2007 | Jayaweera | 709/206 |

FOREIGN PATENT DOCUMENTS

| JP | 2001-142801 | | 5/2001 |
| JP | 2001-356991 | | 12/2001 |
| JP | 2001356991 A | * | 12/2001 |
| JP | 2003-67306 A | | 3/2003 |
| JP | 2005063221 A | * | 3/2005 |
| JP | 2006-072535 | | 3/2006 |
| JP | 2006072535 A | * | 3/2006 |

OTHER PUBLICATIONS

Takeshi Fukagawa, "Application Comparison, for You Wondering Which one to Choose" DOS/V Special, Apr. 1, 2006, vol. 9, No. 6, pp. 135, by Mainichi Communications Inc., and English Translation of a Relating Part Therein, (entire text on that page).

(Continued)

*Primary Examiner* — William Bashore
*Assistant Examiner* — Gregory A DiStefano
(74) *Attorney, Agent, or Firm* — Buchanan Ingersoll & Rooney PC

(57) ABSTRACT

An e-mail processing apparatus, comprising: a communication part that receives e-mails; an accumulator that accumulates the e-mails received via the communication part; a display; and a controller that makes the display display in tree structure, cross relationships between the accumulated e-mails, based on past data of the accumulated e-mails.

22 Claims, 21 Drawing Sheets

OTHER PUBLICATIONS

Masatoshi Ito, Shuriken Pro by Justsystems: the Internet Mail Software with Visual Loyalty Plenty Functions and Enhanced Utility Which is a Featured Article on p. 147 of "Oh! PC vol. 19, No. 4" Publish on Apr. 1, 2000, by Softbank Publishing Corp., and English Translation of a relating part therein (partial text from the middle in the left section on that page).

"Tenka Gyoten, Esoteric Techniques of Eudora" that is an article on p. 125 of "ASCII vol. 24, No. 12" published on Dec. 1, 2000, by ASCII Inc., and English Translation of a relating part therein (partial text from the middle in the left section on that page).

Notification of Reasons for Refusal in JP 2006-228491 dated Jul. 15, 2008, and English Translation thereof.

Notification of Decision for Rejection issued by Japan Patent Office on Jul. 8, 2008 in corresponding Japanese Patent Application No. 2006-228491, and English translation thereof.

"Attachment Files Managing Plug-in for Becky! 2." *Hamface*, 2001, online article at http://www.letsware.com/b2/.

* cited by examiner

An example of description of e-mail header

| | |
|---|---|
| Received: | *********** |
| Received: | *********** |
| Received: | *********** |
| Received: | *********** |
| Received: | *********** |
| Message-ID: | <0012345abcde$1234abcd$11111111@ASAN> |
| From: | =?ASAN?=<ASANi@ne.jo> |
| To: | =?CSAN?=<CSANi@ne.jo> |
| References: | <0112345abcde$1234abcd$11111111@CSAN> |
| | <1112345abcde$1234abcd$11111111@ASAN> |
| | <0022345abcde$1234abcd$11111111@BSAN> |
| | <0222345abcde$1234abcd$11111111@CSAN> |
| Subject: | =?1NOKENNNITUITE? |
| Date: | Mon,1 Feb 2006 16:16:16 +0900 |
| MIME-Version:1.0 | |

Received: Forwarding routes of the e-mail

Message-ID: A unique ID number of the message (E-mail)

From: A mail address of the originator of the message (e-mail)

To: A destination mail address of the e-mail

References: A series of message IDs related to the e-mail

Subject: A subject of the e-mail

Date: Transmitting date and time of the e-mail

FIG.4

| E-mail Number | Originator | Destination1 | Destination2 | CC | Subject | Attachment File |
|---|---|---|---|---|---|---|
| 001 | C | A | B | E | 1 | file001 |
| 002 | A | C |  | BE | RE:1 |  |
| 003 | B | C | A | AE | RE:1 | file001 |
| 004 | C | A | B | E | RE:1 |  |
| 005 | A | C | B | E | RE:1 |  |
| 006 | B | A | D | E | 2 | file001 updated |
| 007 | B | A | D | E | 2 updated | file001 updated |
| 008 | D | B | A | E | RE:2 updated | file001 updated |
| 009 | A | B | D | E | RE:2 updated | file001 updated |
| 010 | B | A | D | E | RE:2 updated | file002 |
| 011 | D | A | B | E | RE:2 updated | file002 |
| 012 | C | A | B | F | 3 | file003 |
| 013 | A | C |  | BF | RE:3 |  |
| 014 | B | C |  | AF | RE:3 | file003 |
| 015 | C | A | B | F | RE:3 |  |
| 016 | A | C | B | F | RE:3 |  |
| 017 | B | A | D | F | 3 | file003 updated |
| 018 | B | A | D | F | 3 updated | file003 updated |
| 019 | D | B | A | F | RE:3 updated | file003 last updated |
| 020 | A | B | D | F | RE:3 updated | file003 updated |
| 021 | B | A | D | F | RE:4 updated | file004 |
| 022 | D | A | B | F | RE:4 updated | file004 |
| 023 | C | A | B |  | 5 | file005 |
| 024 | A | C |  | B | RE:5 |  |
| 025 | B | C |  | A | RE:5 | file005 |
| 026 | C | A | B |  | RE:5 |  |
| 027 | A | C | B |  | RE:5 |  |
| 028 | B | A | D |  | 5 | file006 |
| 029 | B | A | D |  | 5 updated | file006 |
| 030 | D | B | A |  | RE:5 updated | file006 |
| 031 | A | B | D |  | RE:5 updated | file007 |
| 032 | B | A | D |  | RE:5 updated | file007 last updated |
| 033 | D | A | B |  | RE:5 updated | file007 |
| 034 | C | A | B |  | RE:RE:5 | file008 |
| 035 | A | C |  | B | RE:RE:5 |  |
| 036 | B | C |  | A | RE:5_2 | file0091 |
| 037 | C | A | B |  | RE:5_2 |  |
| 038 | A | C | B |  | RE:5_2 |  |
| 039 | B | A | D | CHIJ | 6 | file009 updated |
| 040 | B | A | D | CHIJ | 9 updated | file009 updated |
| 041 | D | B | A | CHIJ | RE:9 updated | file009 updated |
| 042 | A | B | D | CHIJ | RE:9 updated | file009 updated |
| 043 | B | A | D | CHIJ | RE:9 updated | file009 last updated |
| 044 | D | A | B | CHIJ | RE:9 updated | file009 last updated |

FIG.5

| Subject | Attachment File |
|---|---|
| 1 | file001 |
| RE:1 | |
| RE:1 | file001 |
| RE:1 | |
| RE:1 | |
| 2 | file001 updated |
| 2改 | file001 updated |
| RE:2 updated | file001 updated |
| RE:2 updated | file001 updated |
| RE:2 updated | file002 |
| RE:2 updated | file002 |
| 3 | file003 |
| RE:3 | |
| RE:3 | file003 |
| RE:3 | |
| RE:3 | |
| 3 | file003 updated |
| 3 updated | file003 updated |
| RE:3 updated | file003 last updated |
| RE:3 updated | file003 updated |
| RE:4 updated | file004 |
| RE:4 updated | file004 |
| 5 | file005 |
| RE:5 | |
| RE:5 | file005 |
| RE:5 | |
| RE:5 | |
| 6 | file006 |
| 6 updated | file006 |
| RE:6 updated | file006 |
| RE:6 updated | file007 |
| RE:6 updated | file007 last updated |
| RE:6 updated | file007 |
| RE:RE:5 | file008 |
| RE:RE:5 | |
| RE:5_2 | file0091 |
| RE:5_2 | |
| RE:5_2 | |
| 9 | file009 updated |
| 9 updated | file009 updated |
| RE:9 updated | file009 updated |
| RE:9 updated | file009 updated |
| RE:9 updated | file009 last updated |
| RE:9 updated | file009 last updated |

FIG.6

| E-mail Number | Originator | Destination1 | Destination2 | CC | Subject | Attachment File |
|---|---|---|---|---|---|---|
| *** | ** | ** | ** | ** | *** | |
| *** | ** | ** | ** | ** | *** | *** |
| *** | ** | ** | ** | ** | *** | |
| *** | ** | ** | ** | ** | *** | |
| *** | ** | ** | ** | ** | *** | |
| 001 | C | A | B | E | 1 | file001 |
| 003 | B | C | A | AE | RE:1 | file001 |
| 004 | C | A | B | E | RE:1 | |
| 006 | B | A | D | E | 2 | file001 updated |
| 014 | B | C | | AF | RE:3 | file003 ★ |
| 015 | C | A | B | F | RE:3 | |
| 026 | C | A | B | | RE:5 | |
| 028 | B | A | D | | 5 | file006 |
| 034 | C | A | B | | RE:RE:5 | file008 |
| 036 | B | C | | A | RE:5_2 | file0091 |
| 037 | C | A | B | | RE:5_2 | |
| *** | ** | ** | ** | ** | *** | |
| *** | ** | ** | ** | ** | *** | *** |
| *** | ** | ** | ** | ** | *** | |
| *** | ** | ** | ** | ** | *** | |
| *** | ** | ** | ** | ** | *** | *** |
| *** | ** | ** | ** | ** | *** | |
| *** | ** | ** | ** | ** | *** | *** |
| *** | ** | ** | ** | ** | *** | *** |

FIG.15

| E-mail Number | Originator | Destination1 | Destination2 | CC | Subject | Attachment File |
|---|---|---|---|---|---|---|
| 001 | C | A | B | E | 1 | file001 |
| 002 | A | C | | BE | RE:1 | |
| 003 | B | C | A | AE | RE:1 | file001 |
| 004 | C | A | B | E | RE:1 | |
| 005 | A | C | B | E | RE:1 | |
| 006 | B | A | D | E | 2 | file001 updated |
| 007 | B | A | D | E | 2 updated | file001 updated |
| 008 | D | B | A | E | RE:2 updated | file001 updated |
| 009 | A | B | D | E | RE:2 updated | file001 updated |
| 010 | B | A | D | E | RE:2 updated | file002 |
| 011 | D | A | B | E | RE:2 updated | file002 |
| 012 | C | A | B | F | 3 | file003 |
| 013 | A | C | | BF | RE:3 | |
| 014 | B | C | | AF | RE:3 | file003 ★ |
| 015 | C | A | B | F | RE:3 | |
| 016 | A | C | B | F | RE:3 | |
| 017 | B | A | D | F | 3 | file003 updated |
| 018 | B | A | D | F | 3 updated | file003 updated |
| 019 | D | B | A | F | RE:3 updated | file003 last updated |
| 020 | A | B | D | F | RE:3 updated | file003 updated |
| 021 | B | A | D | F | RE:4 updated | file004 |
| 022 | D | A | B | F | RE:4 updated | file004 |
| 023 | C | A | B | | 5 | file005 |
| 024 | A | C | | B | RE:5 | |
| 025 | B | C | | A | RE:5 | file005 |
| 026 | C | A | B | | RE:5 | |
| 027 | A | C | B | | RE:5 | |
| 028 | B | A | D | | 5 | file006 |
| 029 | B | A | D | | 5 updated | file006 |
| 030 | D | B | A | | RE:5 updated | file006 |
| 031 | A | B | D | | RE:5 updated | file007 |
| 032 | B | A | D | | RE:5 updated | file007 last updated |
| 033 | D | A | B | | RE:5 updated | file007 |
| 034 | C | A | B | | RE:RE:5 | file008 |
| 035 | A | C | | B | RE:RE:5 | |
| 036 | B | C | | A | RE:5_2 | file0091 |
| 037 | C | A | B | | RE:5_2 | |
| 038 | A | C | B | | RE:5_2 | |
| 039 | B | A | D | CHIJ | 6 | file009 updated |
| 040 | B | A | D | CHIJ | 9 updated | file009 updated |
| 041 | D | B | A | CHIJ | RE:9 updated | file009 updated |
| 042 | A | B | D | CHIJ | RE:9 updated | file009 updated |
| 043 | B | A | D | CHIJ | RE:9 updated | file009 last updated |
| 044 | D | A | B | CHIJ | RE:9 updated | file009 last updated |

The item with a "★" mark is specified file.

FIG.16

The item with a "★" mark is specified file.

E-MAIL PROCESSING APPARATUS, E-MAIL PROCESSING METHOD AND RECORDING MEDIUM

This application claims priority under 35 U.S.C. §119 to Japanese Patent Application No. 2006-228491 filed on Aug. 24, 2006, the entire disclosure of which is incorporated herein by reference in its entirety.

BACKGROUND OF THE INVENTION

1. Field of the Invention

The present invention relates to an e-mail processing apparatus, which is applied to a MFP (Multi Function Peripheral), e.g. a multifunctional digital complex machine, and other image forming apparatuses; an e-mail processing method; and a recording medium having a program recorded therein to make a computer execute e-mail processing.

2. Description of the Related Art

The following description sets forth the inventor's knowledge of related art and problems therein and should not be construed as an admission of knowledge in the prior art.

With the spread of e-mail in recent years, in companies, offices and others, employees become to exchange more frequently e-mails with or without an attachment file using a mailing list, to achieve higher business productivity.

A heretofore known art that has been conventionally used is that members of mailing list are registered in a MFP and a series of e-mails are recorded in a recording area that is called "BOX", so that the members of mailing list easily can track things backward.

According to the art, if a user transfers to a MFP an e-mail that is once distributed using a mailing list, the MFP generates a BOX for the mailing list, then stores in the BOX the received e-mail with a file attached to the e-mail. Subsequently, the MFP inquires a server for members (mail addresses) of the mailing list, then gives a permission to access the BOX to login users having the mail addresses. Further, the MFP inquires for members of the mailing list at predetermined intervals. Then, if there is a member newly added to the mailing list, the MFP adds the member as a login account of the MFP itself, and if the MFP is not a member of the mailing list, the MFP adds the mail address of the MFP itself in the mailing list.

Meanwhile, another art disclosed in the Japanese Unexamined Laid-open Patent Publication No. 2003-67306 is that a file attached to a transmitted e-mail is picked up, and administration information about the attachment file that is picked up is generated, in order to administer the attachment file.

With the conventional methods described above, members of a mailing list can read the e-mails and the attachment files of the past. However, because such a large amount of e-mails and attachment files are exchanged and a large amount of files are stored in a BOX, it is needed to devote substantial time to search out a target file from the BOX.

To address the inconvenience, the last updated files are conventionally searched according to update dates/times, file versions, and others. However, in cases where files are updated by a series of the complex processings like in the way above, not only file versions are not administered correctly, but also attachment files cannot be tracked by update dates/times. Thus, it is the only one method to search out a target file to check contents of the respective files in chronological order.

In addition, with the art disclosed in the patent document mentioned above, although files are differentiated by the categories, it is still inconvenient that a target file cannot be searched out quickly because there are a lot of files with the same file names, and with the same updated time/date, and others. In addition, although a target can be narrowed down to some related files, there is still a need to take a view of all the related files consequently, and this is such a significant load of laborious work.

In circumstances where e-mails are used for business, even file names of attachment files and mail subjects are frequently changed in many cases. Thus, in order to achieve higher business productivity, it is inevitable to bother to track e-mails and attachment files that have been exchanged.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

An object of the present invention is to provide an e-mail processing apparatus enabling e-mails and attachment files of the past to be checked easily.

Another object of the present invention is to provide an e-mail processing method enabling e-mails and attachment files of the past to be checked easily.

Yet another object of the present invention is to provide a recording medium having a program recorded therein to make a computer execute e-mail processing.

According to a first object of the present invention is an e-mail processing apparatus, comprising:
 a communication part that receives e-mails;
 an accumulator that accumulates the e-mails received via the communication part;
 a display; and
 a controller that makes the display display in tree structure, cross relationships between the accumulated e-mails, based on past data of the accumulated e-mails.

According to a second object of the present invention is an e-mail processing apparatus, comprising:
 a communication part that receives e-mails;
 an accumulator that accumulates the e-mails received via the communication part;
 a display;
 an acquirer that acquires from a server, e-mails that are related to an optional e-mail selected by a user among the e-mails accumulated in the accumulator; and
 a controller that makes the display display in tree structure, cross relationships between the acquired e-mails.

According to a third object of the present invention is an e-mail processing method, comprising:
 receiving e-mails;
 accumulating the received e-mails; and
 making a display display in tree structure, cross relationships between the accumulated e-mails, based on past data of the accumulated e-mails.

According to a fourth object of the present invention is an e-mail processing method, comprising:
 receiving e-mails;
 accumulating the received e-mails;

acquiring from a server, e-mails that are related to an optional e-mail selected by a user among the accumulated e-mails; and making a display display in tree structure, cross relationships between the acquired e-mails.

According to a fifth object of the present invention is a recording medium having a program recorded therein to make a computer execute:

receiving e-mails;

accumulating the received e-mails; and making a display display in tree structure, cross relationships between the accumulated e-mails, based on past data of the accumulated e-mails.

According to a sixth object of the present invention is a recording medium having a program recorded therein to make a computer execute:

receiving e-mails;

accumulating the received e-mails;

acquiring from a server, e-mails that are related to an optional e-mail selected by a user among the accumulated e-mails; and making a display display in tree structure, cross relationships between the acquired e-mails.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 4 is a diagram showing an example of data description in a header followed by an e-mail body;

FIG. 5 is a diagram showing e-mails and attachment files exchanged among mail members, in chronological order;

FIG. 6 is a diagram showing an example of e-mails and attachment files displayed in tree structure;

FIG. 15 is a diagram showing a list of the e-mails stored in a BOX of a user;

FIG. 16 is a diagram showing a list of all the e-mails having the same message-ID as an e-mail specified by a user;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
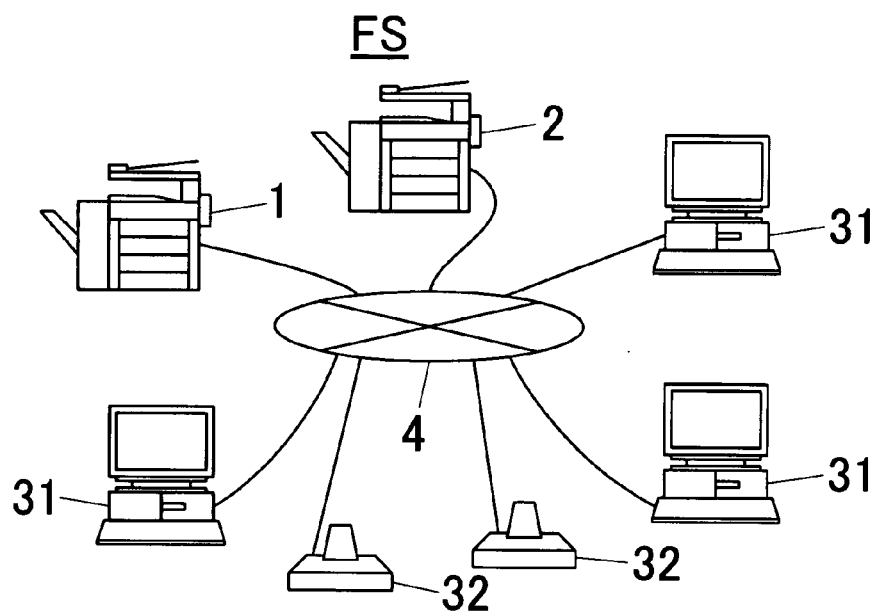
FIG. 1 is a schematic diagram showing a configuration of an image processing system in which an e-mail processing apparatus according to one embodiment of the present invention is used.

FIG. 1 is a schematic diagram showing a configuration of an image processing system in which an e-mail processing apparatus according to one embodiment of the present invention is used.

As shown in FIG. 1, the image processing system comprises MFPs 1 and 2 as one or more e-mail processing apparatuses, one or more personal computers (PCs) 31, and one or more FAX terminals 32. And those MFPs 1 and 2, PC 31 and FAX terminal 32 are interconnected via a communications line 4 for mutual communication.

A LAN, the Internet, a dedicated line, or a public line is used as the communications line 4.

Computer names such as "PC001" and "PC002" are provided as identification information for the MFPs 1 and 2, and PC 31, to identify each of them. Instead of such computer names above, IP addresses can be also used as identification information. Numbers of so-called fixed line phone or IP phone are provided for the respective FAX terminals.

Hereinafter, it will be explained about the MFP 1 on behalf of MFPs 1 and 2, since the MFP 2 has the same configuration as the MFP 1.

Figure 2:
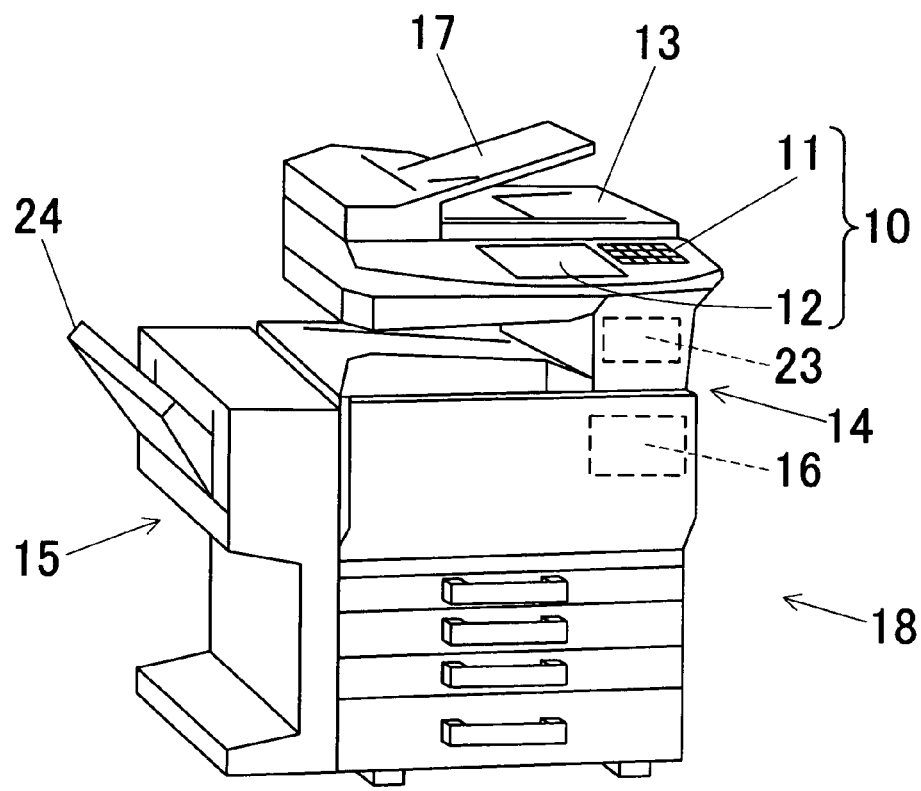
FIG. 2 is an external perspective view of a MFP as an e-mail processing apparatus.
Figure 3:
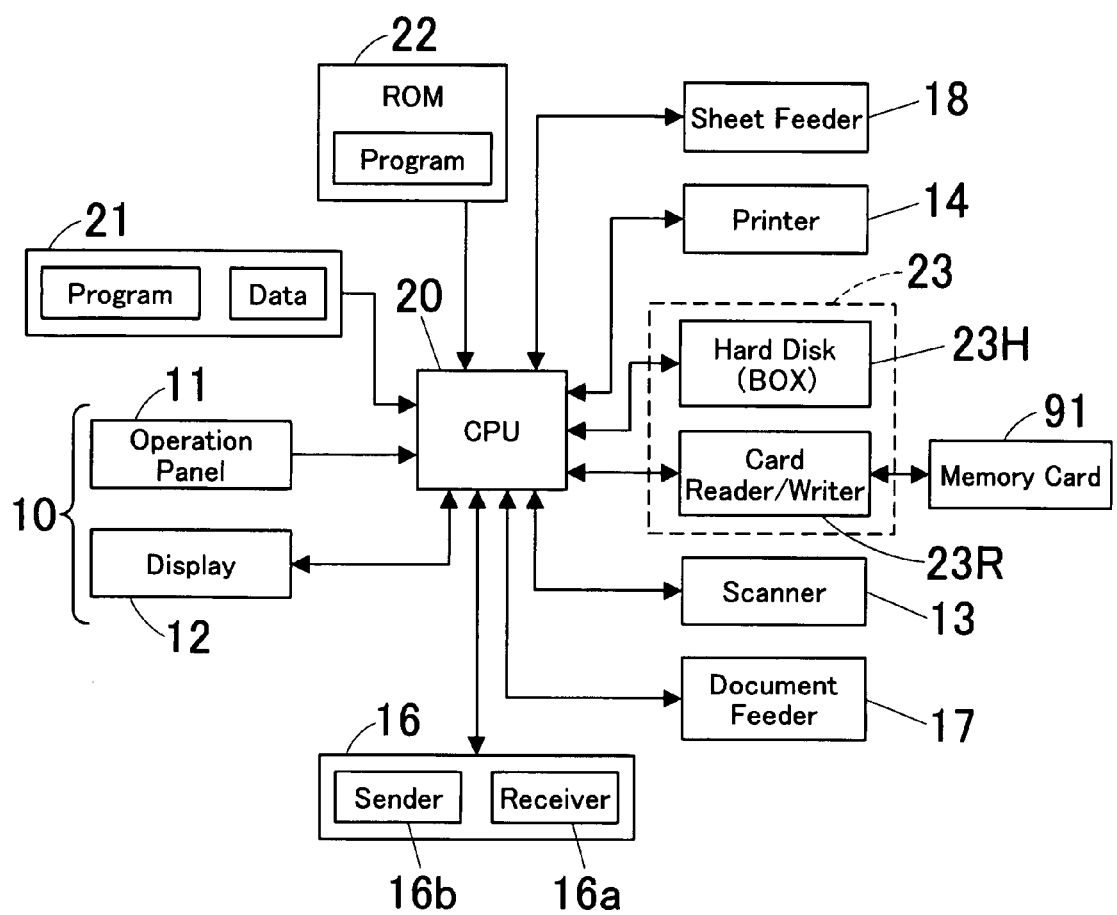
FIG. 3 is a block diagram showing an electrical configuration of the MFP.

FIG. 2 is an external perspective view of the MFP 1, and FIG. 3 is a block diagram showing an electrical configuration of the MFP 1.

As shown in FIG. 2 and FIG. 3, the MFP 1 is an all-in-one apparatus having functions of copy, network-print, scan, FAX, document server and etc.

It is possible to set users not to be permitted to use the MFP 1 unless authentication by user information registered in the MFP 1 succeeds.

The MFP 1 comprises an operation part 10, a scanner 13, a printer 14, a finisher 15, a communication interface 16, a document feeder 17, a sheet feeder 18, a CPU 20, a RAM 21, a ROM 22, and a data memory 23.

The operation part 10 comprises an operation panel 11 and a display 12.

The operation panel 11 comprises a plurality of keys for inputting characters such as numbers, letters and marks, a sensor (not shown in the Figure) for sensing pressed keys, a transmission circuit (not shown in the Figure) for transmitting to the CPU 20 signals indicating the pressed keys, and others.

The display 12 displays screens for letting users read messages or instructions, input instructions for setting and processing, confirm image formed and processing results drawn by the MFP 1, and etc. A touch panel liquid crystal (LCD) that is used as the display 12 for example, has a function to sense locations on itself, where are touched by users with fingers or others, and then transmit to the CPU 20 signals indicating the sensing results.

As described in the way above, the operation panel 11 and the display 12 serve as a user interface (I/F) for users to operate the MFP 1 directly.

The scanner 13 photoelectrically reads information of image such as photos, characters, drawings, etc. carried by a document to obtain image data. The obtained image data is converted to digital data by an image processor not shown in FIG.; given various kinds of well-known image processings; and transmitted to the printer 14 for image printing, to the communication I/F 16 for data transmission, or to the memory 23 for data recording for future use.

The printer 14 prints on recording sheets made of paper, film, or etc., the image data read by the scanner 13, or the image data received by the communication part 16 from external devices, or the image data accumulated in the memory 23.

The sheet feeder 18, which is located in the lower region of the body of the MFP 1 for example, provides the printer 14 with recording sheets suitable for the image to be printed.

Upon receiving printed sheets that are the recording sheets whereon the image is printed, the finisher 15 executes processings such as stapling and punching on the printed sheets according to mode settings, and discharges them into a tray 24.

The communication I/F 16 comprises a sender 16a, a receiver 16b, and others, and exchanges data with the PC 31 and the FAX terminal 32. A NIC (Network Interface Card), a modem, or a TA (Terminal Adaptor) is used as the communication I/F 16.

The data memory 23 comprises a hard disk (hereinafter, referred to as "HDD") 23H having a plurality of boxes (BOXes) that are memory areas, a card reader/writer 23R, and others.

The card reader/writer 23R readouts data from a memory card 91 that is a CompactFlash, a SmartMedia or etc., and writes data in the memory card 91.

The memory card 91 is used chiefly for data communication with the PC 31 without involving the communication line 4, and is also used for data backup.

The HDD 23H has storage areas for storing image data read out by the scanner 13, image data received by the communication I/F 16 from external devices, and records of job modes.

Data recorded in the HDD 23H can be accessed from the MFP 2 via the communication line 4.

The CPU 20 controls the overall operations in the MFP 1 by executing a program recorded in the ROM 22 or another program loaded in the RAM 21.

Meanwhile, the PC 31 has an installed application program and a driver for giving instruction against the MFP 1. Thus, users can remotely operate the MFP 1 using the PC 31.

Hereinafter, the method for displaying in tree structure cross relationships of e-mails and attachment files stored in the MFP 1, will be explained.

[Embodiment-1]

In this embodiment, based on the assumption that there is a group consisting of some mail members of a mailing list and e-mails exchanged within the group are recorded in its own received file BOX, the MFP 1 having the shared mailing BOXes in the HDD 23H displays e-mails in tree structure. Thus, e-mails are displayed in tree structure by groups, and the past e-mails exchanged within the group can be checked extremely easily.

FIG. 4 shows an example of data description in a header followed by an e-mail body.

In FIG. 4, data description in a header begins with the items as following:

Received: forwarding routes of the e-mail
Message-ID: a unique ID number of the message (e-mail)
From: a mail address of the originator of the message (e-mail)
To: a destination mail address of the e-mail
References: a series of message IDs related to the e-mail
Subject: a subject of the e-mail
Date: transmitting date and time of the e-mail In the MFP 1, received e-mails are administered by their own message IDs that are provided in the headers of the respective received e-mails. Message IDs are unique for the respective e-mails, different from one e-mail to another, and are never duplicated.

There listed in the "references" in the messages (e-mails) received by a recipient, message IDs of the past e-mails related to the received e-mail.

A message ID, references, a mail subject, and properties of the attachment file are acquired from the header of the received e-mail, and the description in the mail header and linkage destination information of the e-mail data are stored in an e-mail ID administration file.

More specifically, all the message IDs described in the "references" are scanned, then it is checked whether or not there are the same message IDs in those already stored in the BOX of the MFP 1. If there are the same message-IDs in those already stored in the BOX, an e-mail that corresponds to the latest message-ID in the "references" (the message-ID listed at the end) is related to the received e-mail.

In this way as described above, e-mails that have been exchanged are stored and administered to display in tree structure. Thus, cross relationships between past e-mails can be checked by matching message IDs, and the past e-mails are converted to data to be displayed in tree structure according to the cross relationships, and then the data is recorded in the e-mail ID administration file.

As for each of the attachment files, it is checked by its properties, whether or not there is the same attachment file in those already stored. If there is the same attachment file in those already stored, the first received file is defined as an original one, and the later received files are removed. Then the linkage destination is updated with the original file, and a deleting record is added in the e-mail ID administration file.

Hereinafter, file display methods using the e-mail ID administration file will be explained.

FIG. 5 shows a list of e-mails exchanged among mail members of a mailing list. With the conventional display method, files are listed simply in chronological order as shown in FIG. 5, and it is significantly difficult to find a target file from the list.

FIG. 6 shows an example of files displayed on the display 12 based on the e-mail ID administration file. Contrary to the chronological display method shown in FIG. 5, in this embodiment, all the e-mails are administered by their own message IDs in the e-mail ID administration file to be displayed in tree structure. In FIG. 6, all the files organized in the trees are displayed with cross relationships between the files on the display 12 in the operation panel 10. In addition, mail subjects and attachment files are also displayed in the trees according to the cross relationships of the message IDs.

In this embodiment, one tree corresponds to one topic about which e-mails are exchanged. All the past files related to a large amount of the accumulated e-mails can be checked in the trees, and a target file can be searched out easily checking them.

If the screen of the display 12 in the MFP 1 is rather small, the latest file may be displayed in a pop up window, an expanded window, or etc.

Although not shown in FIG. 6, the screen can be switched to other screens where the files organized by senders, receivers and transmitting dates/times are displayed similarly in tree structure.

In addition, if there is an e-mail with a "cc" destination, the destination also may be displayed additionally. Thus, destination address of an e-mail can be checked.

In this embodiment as mentioned above, if there is the same attachment file (are the same attachment files) in those already received, the first received file is defined as an original one, and the later received files are removed. Then the attachment file linkage destination is updated with the original file.

Figure 7:
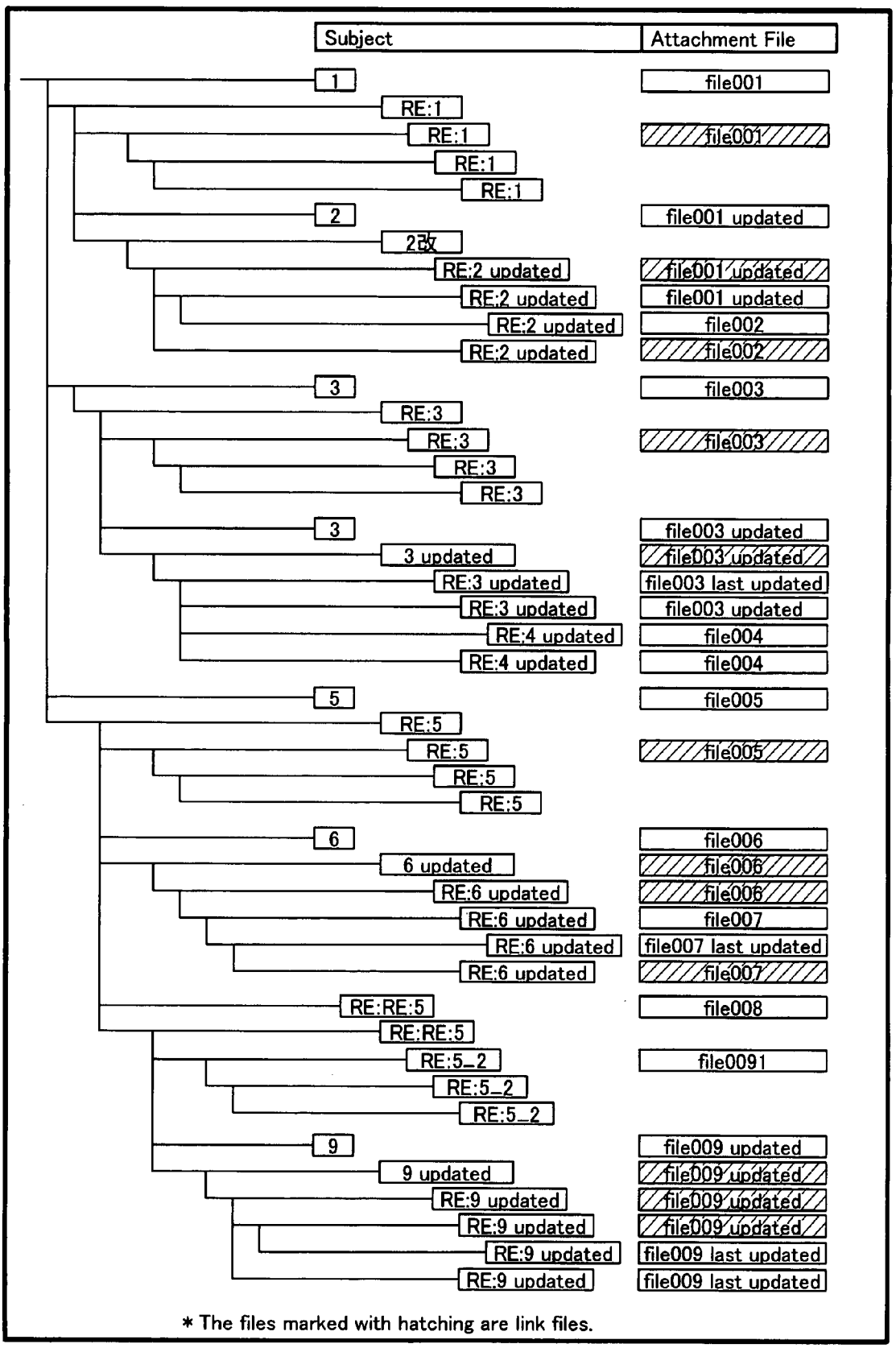
FIG. 7 is a diagram showing another example of e-mails and attachment files displayed in tree structure, wherein duplicated attachment files are displayed in a different form.

In FIG. 7, the removed attachment files are displayed in a different form to indicate those are transmitted without updates. The portions marked with hatching indicate the removed files (referred to as "link files" in FIG.), and those may be also marked with a different color. Thus, the e-mails and attachment files of the past, which are exchanged regarding a tree (a topic about which e-mails are exchanged), can be checked easily. Although not shown in FIG., the files organized by duplicated files may be displayed similarly in a different form.

Figure 8:
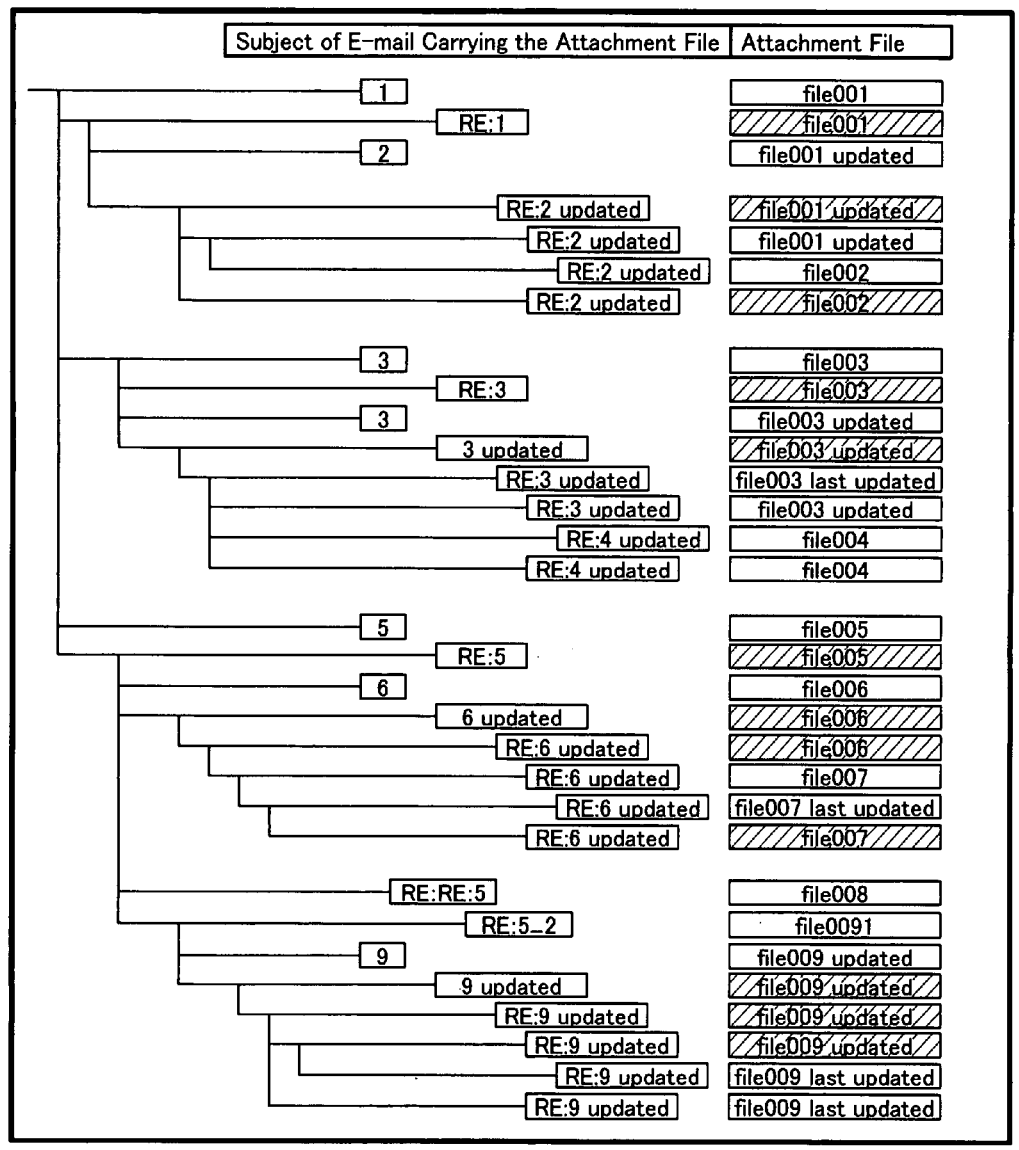
FIG. 8 is a diagram showing yet another example of e-mails and attachment files displayed in tree structure, wherein the e-mails carrying attachment files are picked up from FIG. 7.

FIG. 8 shows an example where e-mails not carrying any attachment file are removed from the tree in FIG. 7. In this embodiment, data amount is reduced for easy identification.

Figure 9:
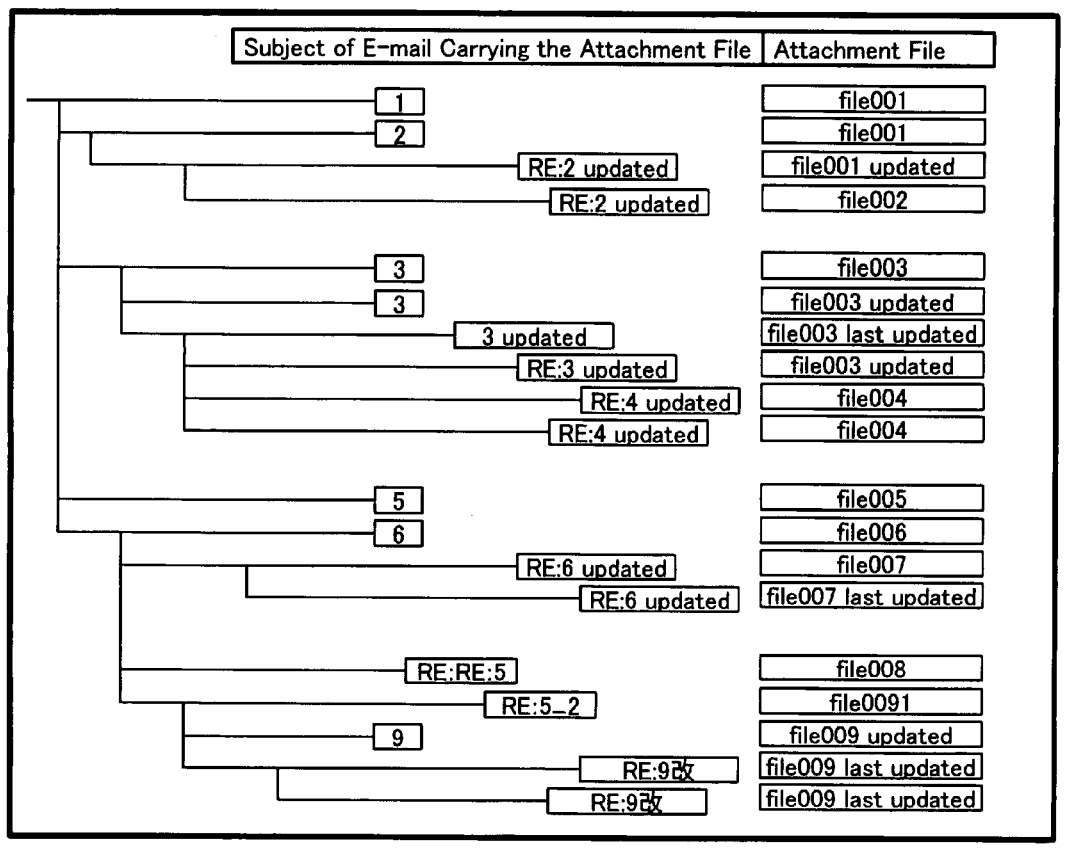
FIG. 9 is a diagram showing still yet another example of e-mails and attachment files displayed in tree structure, and duplicated files are removed and e-mails carrying original attachment files and the original attachment files are picked up from FIG. 8.

FIG. 9 shows an example where e-mails carrying duplicated attachment files and the duplicated attachment files are removed from the tree in FIG. 8 and e-mails carrying original attachment files and the original attachment files are displayed. In this embodiment, un-updated attachment files such as those transmitted by mistake are not displayed, and a target attachment file can be searched out more easily.

Further, as shown in the tree, there are four topics with "001" and "002" serieses of files; "003" and "004" serieses of files; "005", "006" and "007" serieses of files; and "008" and "009" serieses of files. As for the "003" and "004" serieses of files, for example, a "file 003 updated" a first "file 004" and a second "file 004" (other than the former "file 004" although the file names are the same) are originated from the "the latest file 003", and the second "file 004" followed by the "file 003 updated" and the first "file 004" is the latest file for the topic. Thus, a target file can be searched out easily by checking the files.

As described above, a target file can be searched out easily from serieses of files by checking cross relationships between the files.

Hereinafter, switching tree-displayed screens that are displayed on the display 12 will be explained with reference to FIG. 10, FIG. 11, FIG. 12 and FIG. 13.

Figure 10:
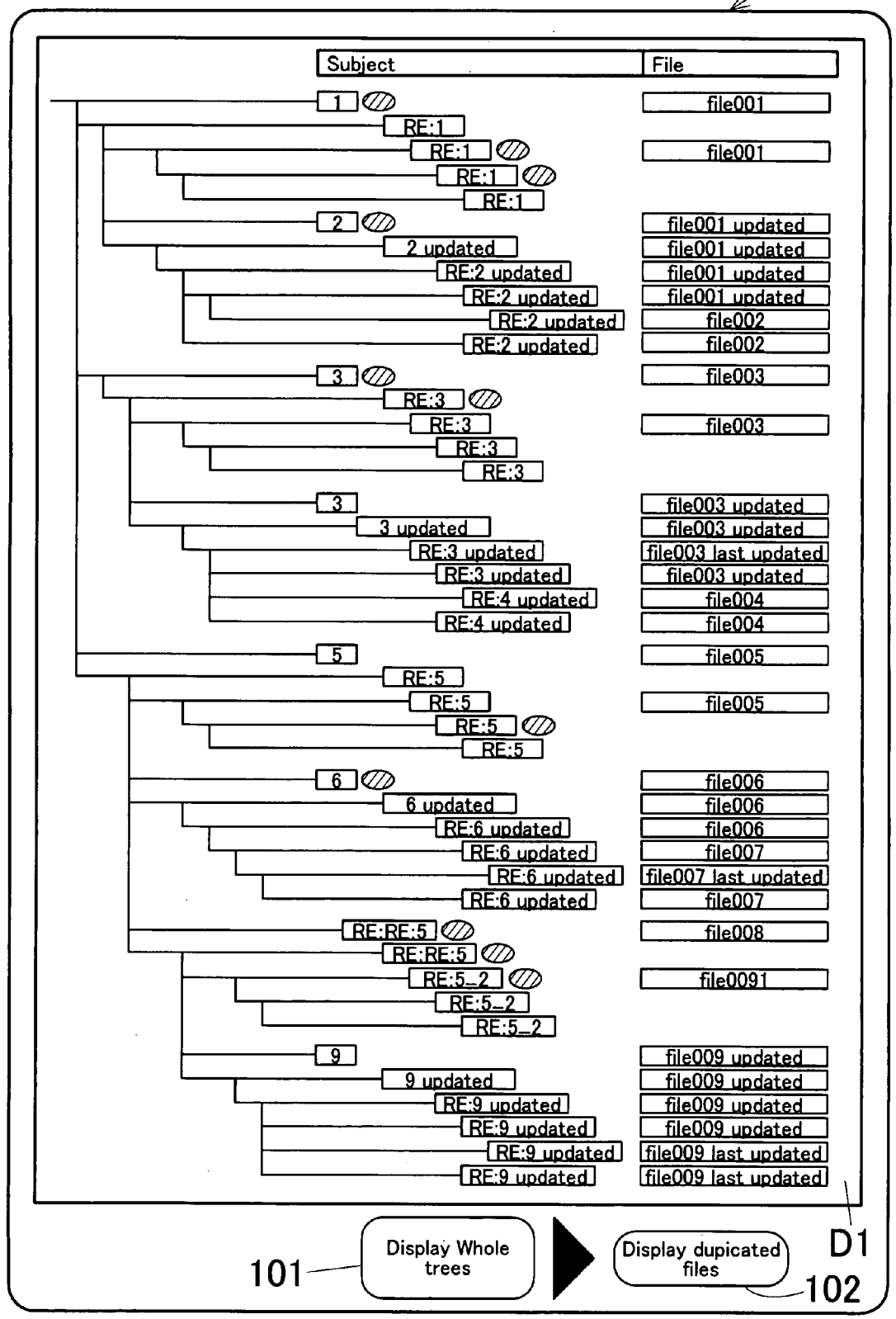
FIG. 10 is a diagram showing a display screen where all the e-mails and the attachment files are displayed in tree structure.
Figure 11:
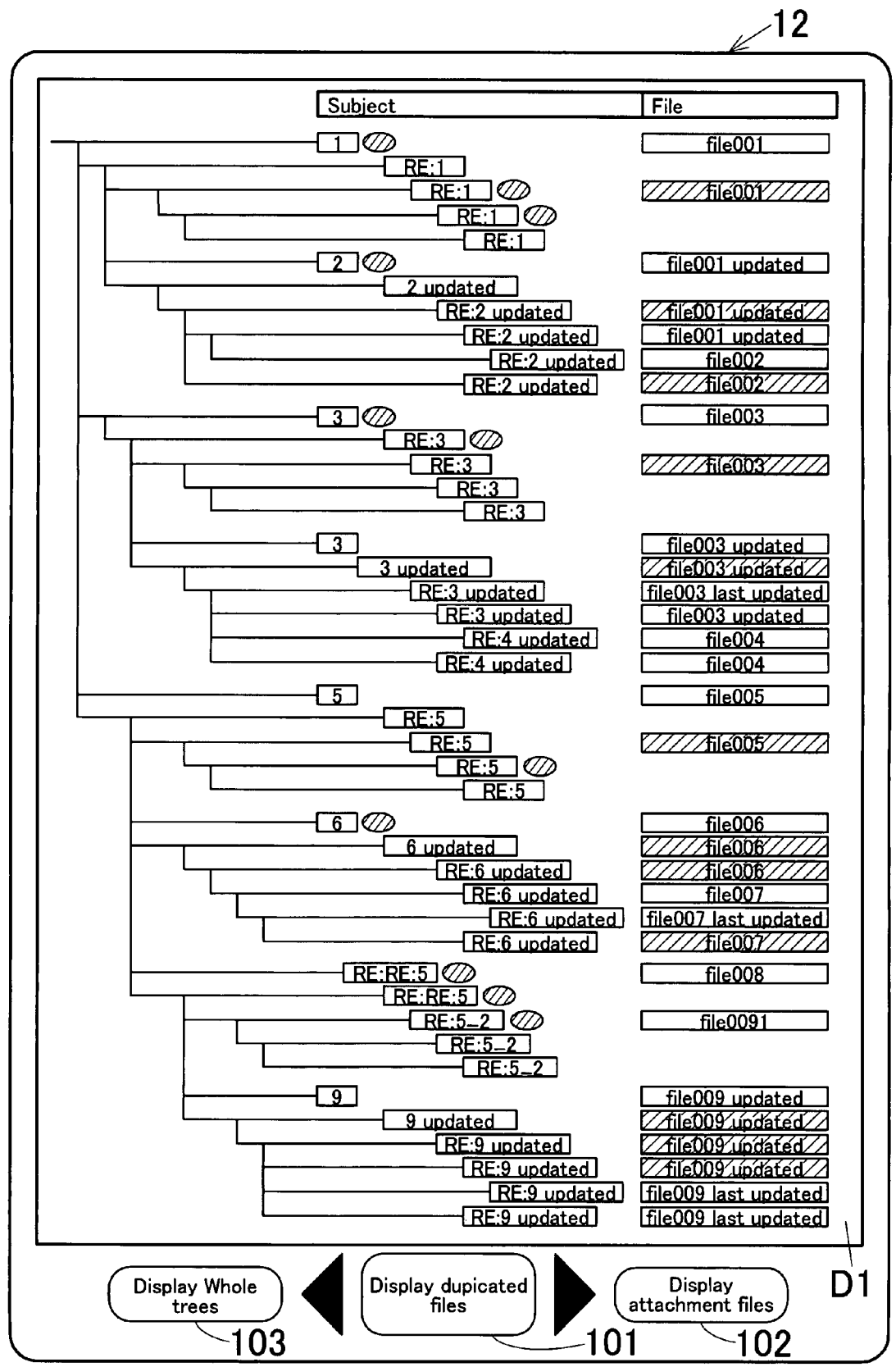
FIG. 11 is a diagram showing a display screen where duplicated attachment files are displayed in a different form.
Figure 12:
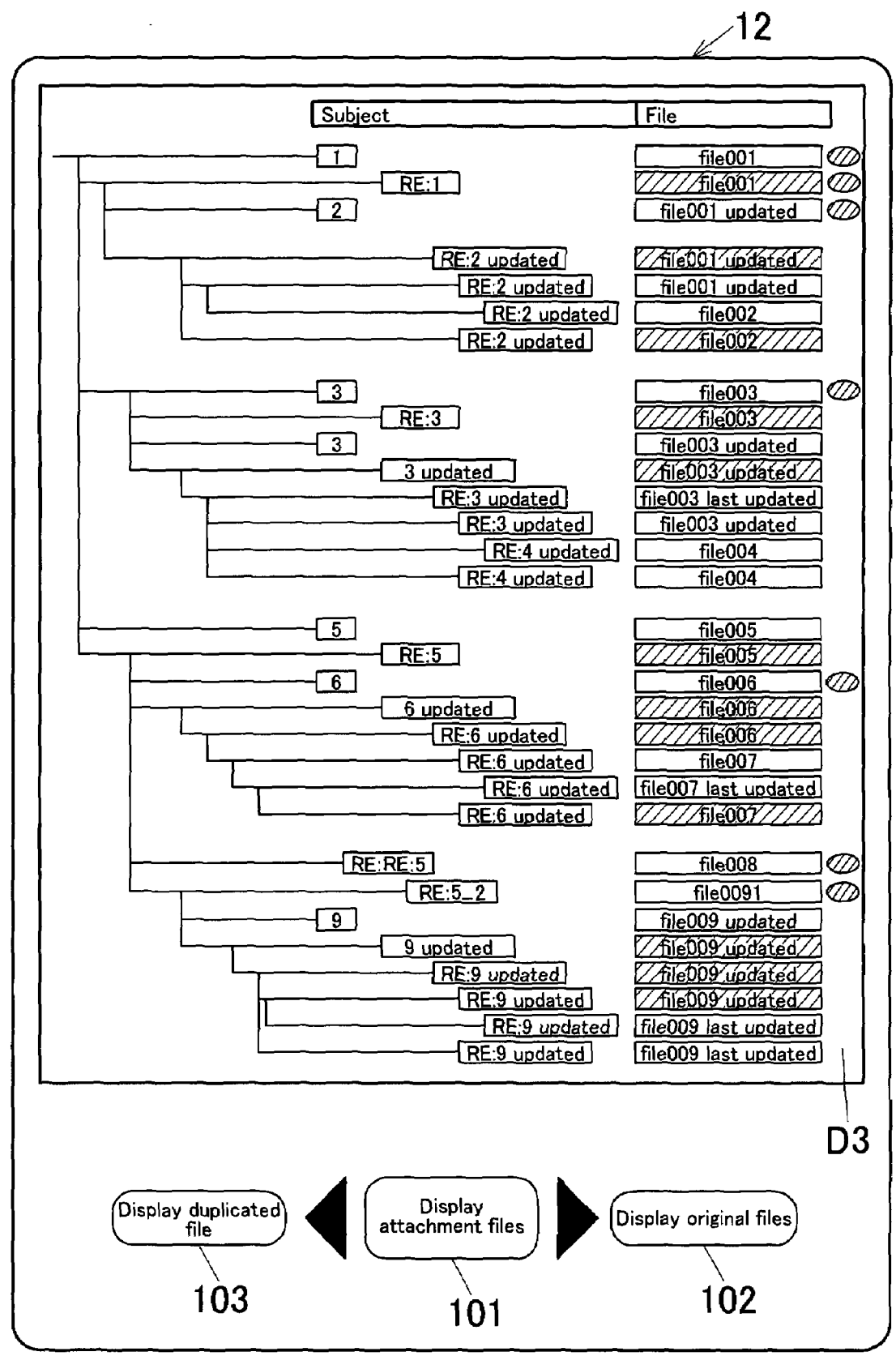
FIG. 12 is a diagram showing a display screen where e-mails carrying attachment files and the attachment files are displayed.

FIG. 10 is a tree-displayed screen D1 (corresponding to FIG. 6) where all the e-mails and the attachment files are displayed in tree structure, and FIG. 11 is a display screen D2 (corresponding to FIG. 7) where duplicated attachment files that are removed are displayed in a different form. FIG. 12 is a display screen D3 (corresponding to FIG. 8) where attachment files are displayed, and FIG. 13 is a display screen D4 (corresponding to FIG. 9) where original attachment files are displayed.

On the lower side of the respective display screens D1, D2, D3 and D4, there is a central button 101 for indicating a title of the current screen, a selection button 102 for switching to another display screen where the information is more simplified than the current screen and a selection button 103 for switching to another display screen where the information is further segmentalized than the current screen.

For example, if the "display duplicated files" button 102 in the right of the screen is touched in the display screen D1 in FIG. 10 for displaying all the information in tree structure, the screen is switched to the screen D2 in FIG. 11. Then, if the "display attachment files" button 102 in the right of FIG. 11 is touched, the screen is switched to the screen D3 in FIG. 12. And then, if the "display whole trees" button 103 in the right of FIG. 11 is touched, the screen is returned to the screen D1 in FIG. 10.

Figure 13:
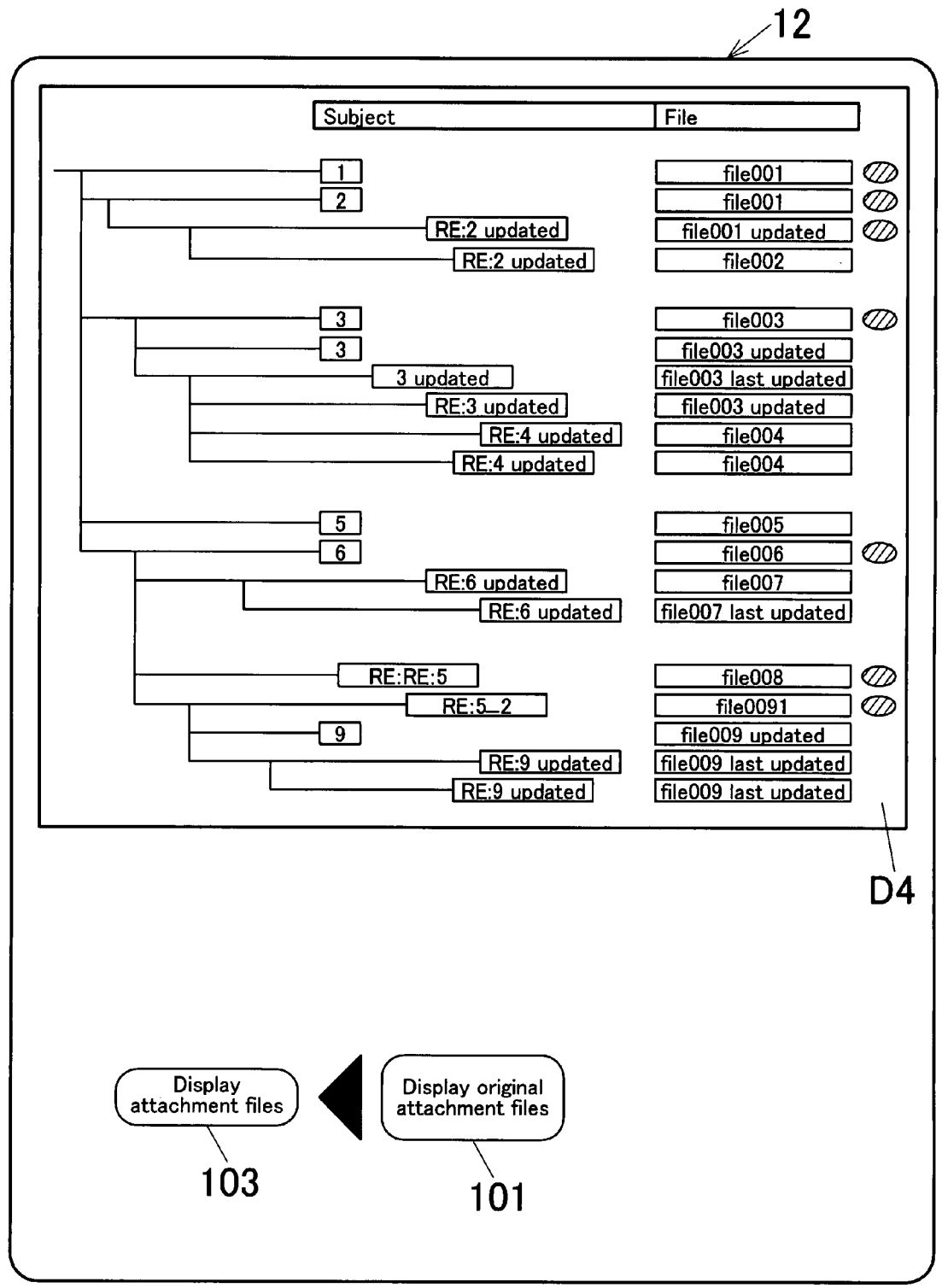
FIG. 13 is a diagram showing a display screen where e-mails carrying original attachment files and the original attachment files are displayed.

If the "display original files" button 102 in the right of the screen is touched in the screen D3 in FIG. 12, the screen is switched to the screen D4 in FIG. 13. Then, if the "display duplicated files" button 103 in the left of FIG. 13 is touched, the screen returns to the screen D2 in FIG. 11. And then, if the "display attachment files" button 103 in the left of the screen 14 in FIG. 13 is touched, the screen is returned to the screen D3 in FIG. 12.

A process starting with e-mail reception, to generate information to be displayed in tree structure will be explained with reference to the flowchart in FIG. 14. This process and the processes in the flowcharts shown in the following Figures are executed by the CPU 20, according to a program recorded in the ROM 22.

Figure 14:
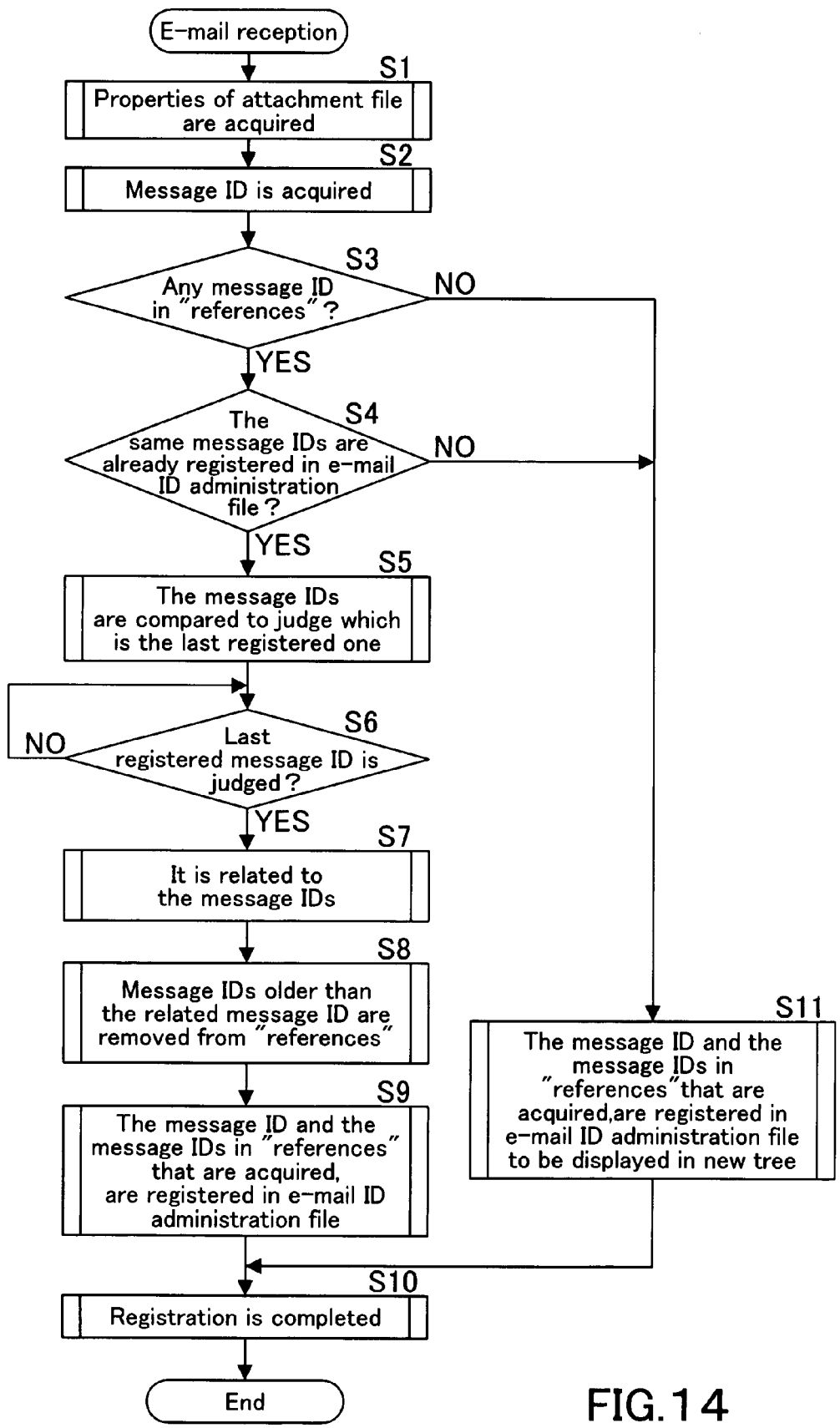
FIG. 14 is a flowchart of a process starting with e-mail reception, to generate information to be displayed in tree structure.

As shown in FIG. 14, when an e-mail is received, properties of the attachment file are acquired in Step S1, and the message ID is acquired in Step S2. Then, it is judged in Step S3, whether or not there is any message ID in the "references" field of the e-mail.

If there is not any message ID in the "references" field (NO in Step S3), the routine proceeds to the Step S11 where the acquired message ID is registered in the e-mail ID administration file to be displayed in a new tree, and then the routine proceeds to the Step S10.

If there is a message ID (are message IDs) in the "references" field (YES in Step S3), it is judged in Step S4, whether or not there are the same message IDs already registered in the e-mail ID administration file. If there are not the same message IDs already registered (NO in Step S4), the routine proceeds to Step S11. If there are the same message IDs already registered (YES in Step S4), then in Step S5, the message IDs are matched to judge which one is the latest, and the routine proceeds to Step S6.

In Step S6, the routine waits until it is judged which message ID is the latest (NO in Step S6), and if it is judged (YES in Step S6), then in Step S7, the latest message-ID is related to the message ID.

Subsequently in Step S8, the message-IDs older than the related message-ID in the "references" field are removed.

In Step S9, the message-ID and the message-IDs in the "references" field that are acquired are registered in the e-mail ID administration file, then a process for registration completion is executed in Step S10, and then the routine terminates.

[Embodiment-2]

In the present embodiment, based on the assumption that an e-mail or an attachment file stored in an individual BOX in the MFP 1 is specified by a user, the related e-mails are acquired from the mail server 31 and displayed in tree structure with cross relationships between the e-mails.

When an e-mail or an attachment file stored in an individual BOX in the MFP 1 is specified by a user, the MFP 1 acquires from the server 31 not only the e-mails sent to the user but also the e-mails sent from the user, by checking those header information, then acquires also the header information of the e-mails and information of the attachment files (file properties).

All the described message IDs from the "references" field of the acquired header information are scanned, and it is checked whether or not there is among the scanned message-IDs the same message-ID as those described in the "references" of the specified e-mail or an e-mail having the specified attachment file.

If there is, similarly to the Embodiment-1, the respective acquired e-mails are related to each other based on the latest message ID (the message ID listed at the end), and a tree information file is generated to display the past e-mails in tree structure.

FIG. 15 shows a list of e-mails stored in a BOX of a user A.

As shown in FIG. 15, when an e-mail or an attachment file (file 003) is specified (the item with a mark "★" in FIG.), the MFP 1 acquires not only the e-mails sent to and from the user from the mail server 31, but also header information and attachment file information of all the acquired e-mails having in the "references the same message ID as the specified e-mails or an e-mail carrying the specified attachment file".

FIG. 16 shows a list of all the e-mails having in the "references" the same message-ID as the specified e-mail among the e-mails sent to and from the user A.

Figure 17:
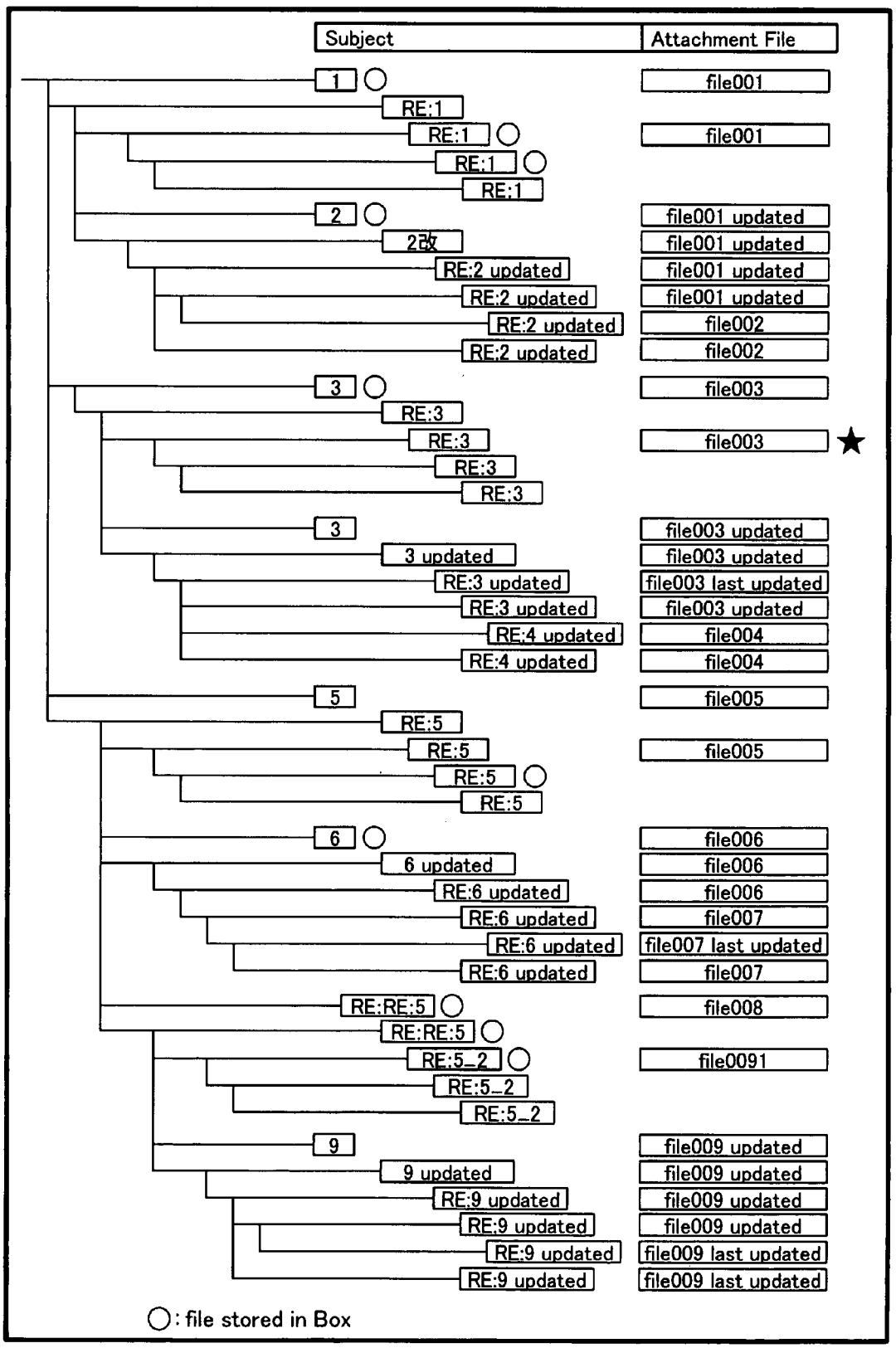
FIG. 17 is a diagram showing an example of the e-mails and the attachment files displayed in tree structure, wherein those are picked up from the list of FIG. 16.

FIG. 17 shows an example of the e-mails from the list, which are displayed in tree structure based on the tree information file.

As shown in FIG. 17, more than three times the amount of attachment files than those in the BOX (shown in FIG. 15) are displayed in the trees. Thus, related files including files that could not been searched in the conventional display method can be displayed.

In FIG. 17, a mark "○" indicates that it is a file stored in a BOX of a user, and the mark "★" indicates that it is a file specified by the user.

Figure 18:
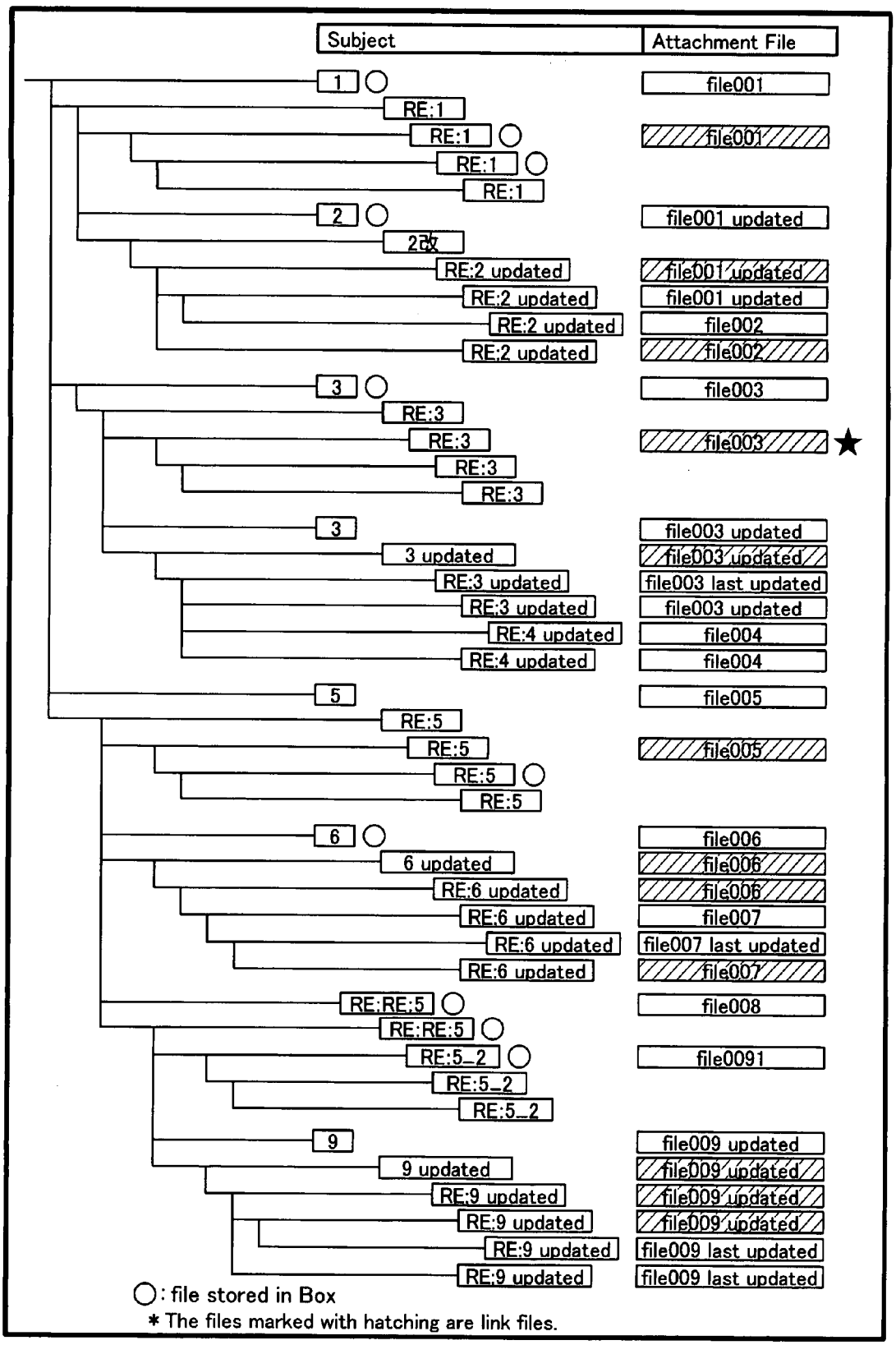
FIG. 18 is a diagram showing another example of e-mails and attachment files displayed in tree structure, wherein the duplicated attachment files are displayed in a different form.

FIG. 18 shows an example of e-mails picked up from the tree in FIG. 17. The e-mails are those carrying duplicated attachment files, and the duplicated attachment files are displayed in a different form, and the duplicated attachment files are marked with hatching in this embodiment. With the display method, users understand which are duplicated files and can search out a target attachment file easily.

Figure 19:
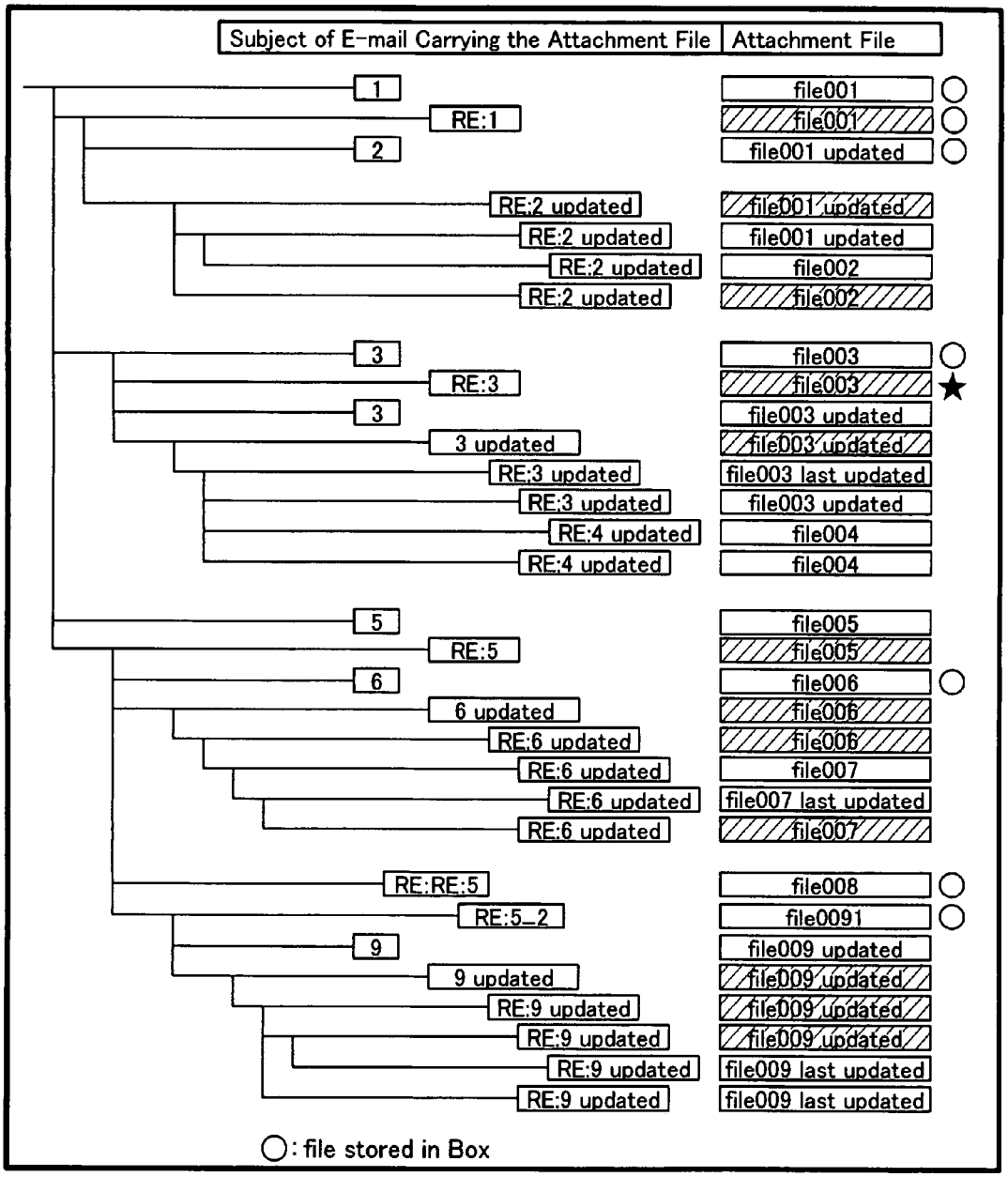
FIG. 19 is a diagram showing yet another example of e-mails and attachment files displayed in tree structure, wherein the e-mails carrying attachment files and the attachment files are picked up from FIG. 18.

FIG. 19 shows an example of e-mails picked up from the tree in FIG. 18. The e-mails are other than those not carrying attachment files and displayed in tree structure. With the display method, data amount is reduced for easy identification.

Figure 20:
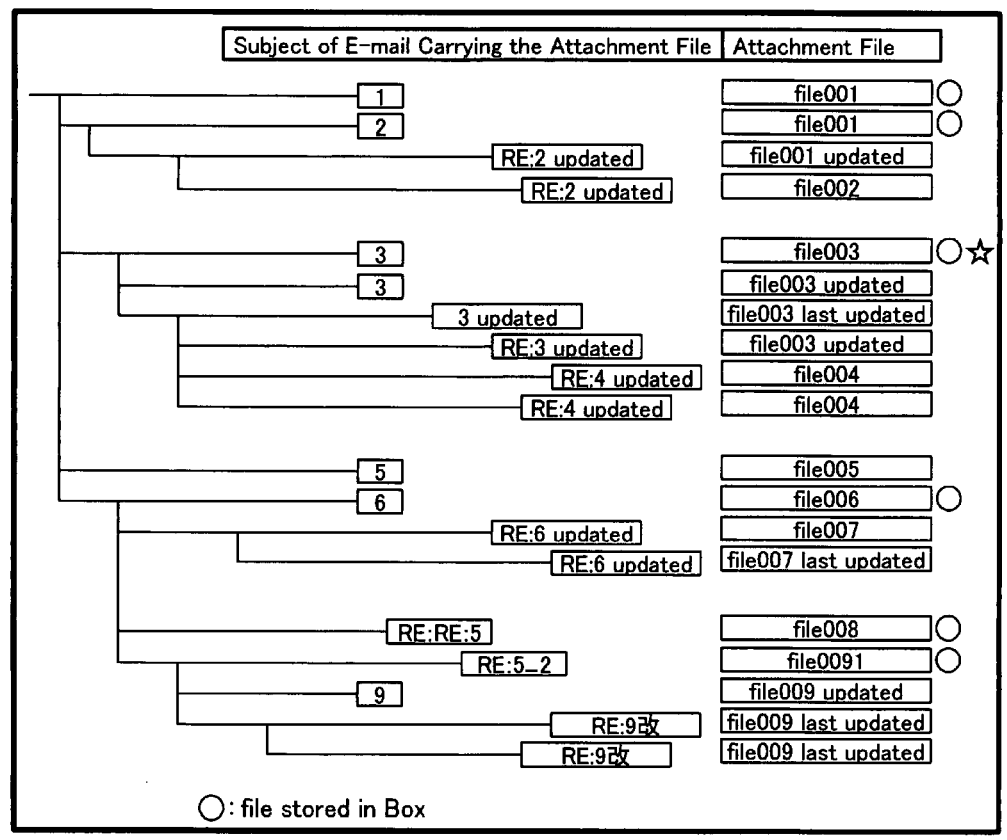
FIG. 20 is a diagram showing still yet another example of e-mails and attachment files displayed in tree structure, and duplicated files are removed and e-mails carrying original attachment files and the original attachment files are picked up from FIG. 19.

In FIG. 20, duplicated files are removed from FIG. 19, and the e-mails are those carrying original attachment files. Since it is a duplicated attachment file that the user specified in this embodiment, the specified file is displayed with the mark "★" in FIG. 19, meanwhile the original file is displayed with a star mark of density that is different from the mark "★" (the file is displayed with the mark "☆" in FIG. 20).

With the display method, wasted files such as files transmitted without updates by mistake are not displayed, and a target file can be searched out more easily.

Further, as understood from the tree, there are four topics regarding the file "file 003" that is specified by the user, and "001" and "002" serieses of files, "003" and "004" serieses of files, "005", "006" and "007" serieses of files, and "008" and "009" serieses of files are provided for the topics, respectively.

In addition, as understood from the tree, a "file 003 updated", a first "file 004" and a second "file 004" (other than the former "file 004" although the file names are the same) are originated from the "the latest file 003", and the second "file 004" followed by the "file 003 updated" and the first "file 004" is the latest file for the topic. Thus, a target file can be searched out easily by checking the files.

Hereinafter, a process for displaying e-mails and attachment files in tree structure when an e-mail or an attachment file in a BOX of the MFP 1 is specified by a user will be explained with reference to the flowchart in FIG. 21.

Figure 21:
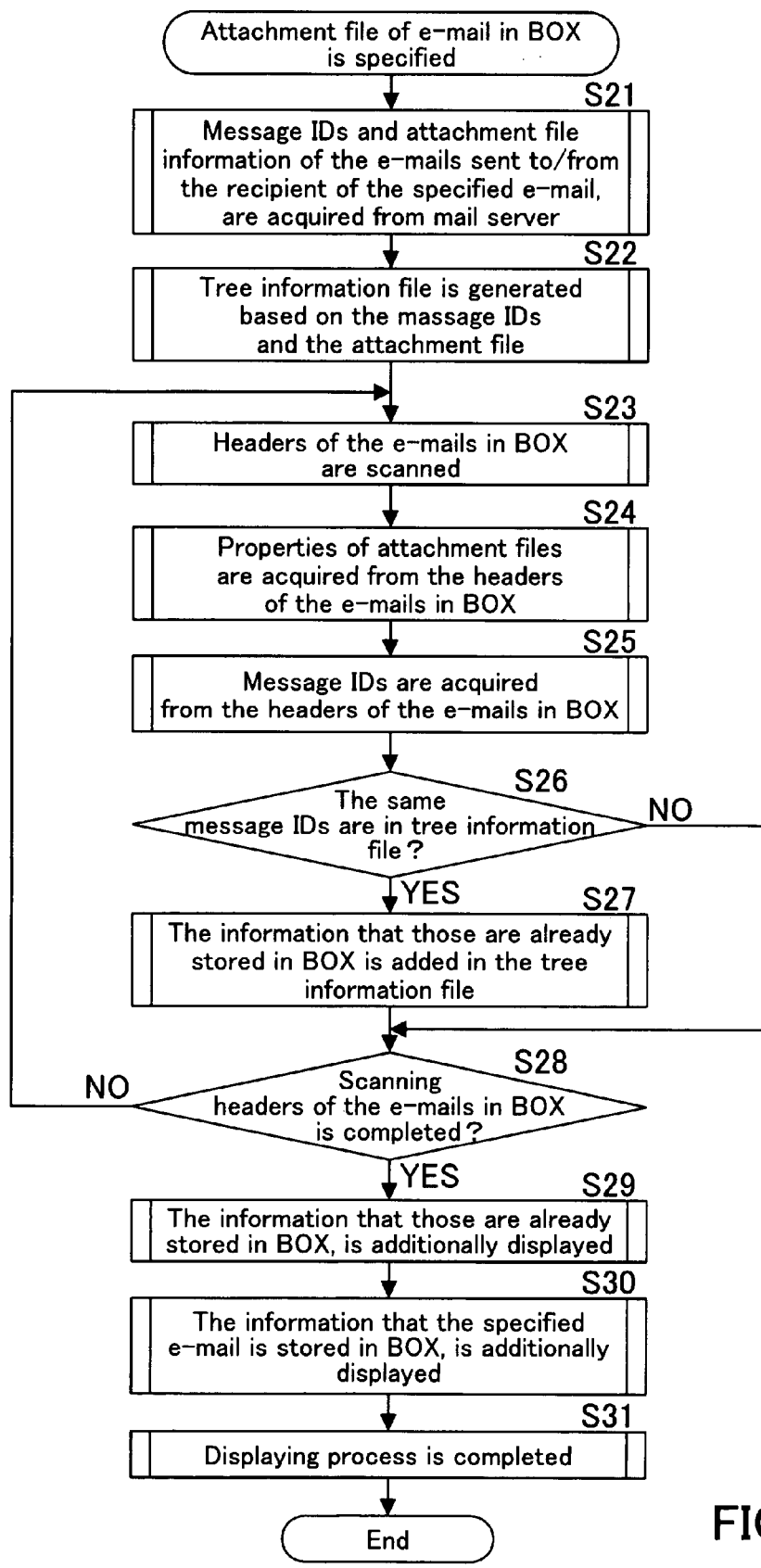
FIG. 21 is a flowchart of a process to display related e-mails and attachment files in tree structure, by specifying an e-mail or an attachment file in a BOX.

In FIG. 21, when an e-mail or an attachment file in a BOX of the MFP 1 is specified by a user, e-mails sent to and from the recipient of the specified e-mail are acquired from the mail server 31 and message IDs and attachment file information of the e-mails are acquired in Step S21. Then in Step 22, the tree information file is generated based on the message IDs and the attachment file information.

In Step 23, headers of the e-mails in the BOX are scanned, then properties of the attachment files are acquired from the mail headers in Step S24, and then the message-IDs are acquired in Step S25.

In Step 26, it is judged whether or not there are the same message IDs in the tree information file, and if there are not the same message IDs in the tree information file (NO in Step S26), the routine proceeds to Step S28. If there are the same message IDs in the tree information file (YES in Step S26), the information that the e-mails having the same message-IDs are already stored in the BOX is added in the tree information file in Step S27. Then the routine proceeds to Step S28.

In Step 28, it is judged whether or not the process of scanning headers of the e-mails in the BOX is completed, if the process of scanning headers of the e-mails in the BOX is not completed (NO in Step S28), the routine goes back to Step S23. If the process of scanning headers of the e-mails in the BOX is completed (YES in Step S28), the information that the e-mails having the same message-IDs are already stored in the BOX is additionally displayed in Step S29, and the information that the specified e-mail is stored in the BOX is additionally displayed in Step S30. Then in Step 31, a tree display completion process is executed, and the routine terminates.

If a user would like to have an attachment file that is not stored in the BOX, he/she may send to an originator of the attachment file, an e-mail requesting to re-send the e-mail having the attachment file, by clicking the attachment file on the screen.

Figure 22:
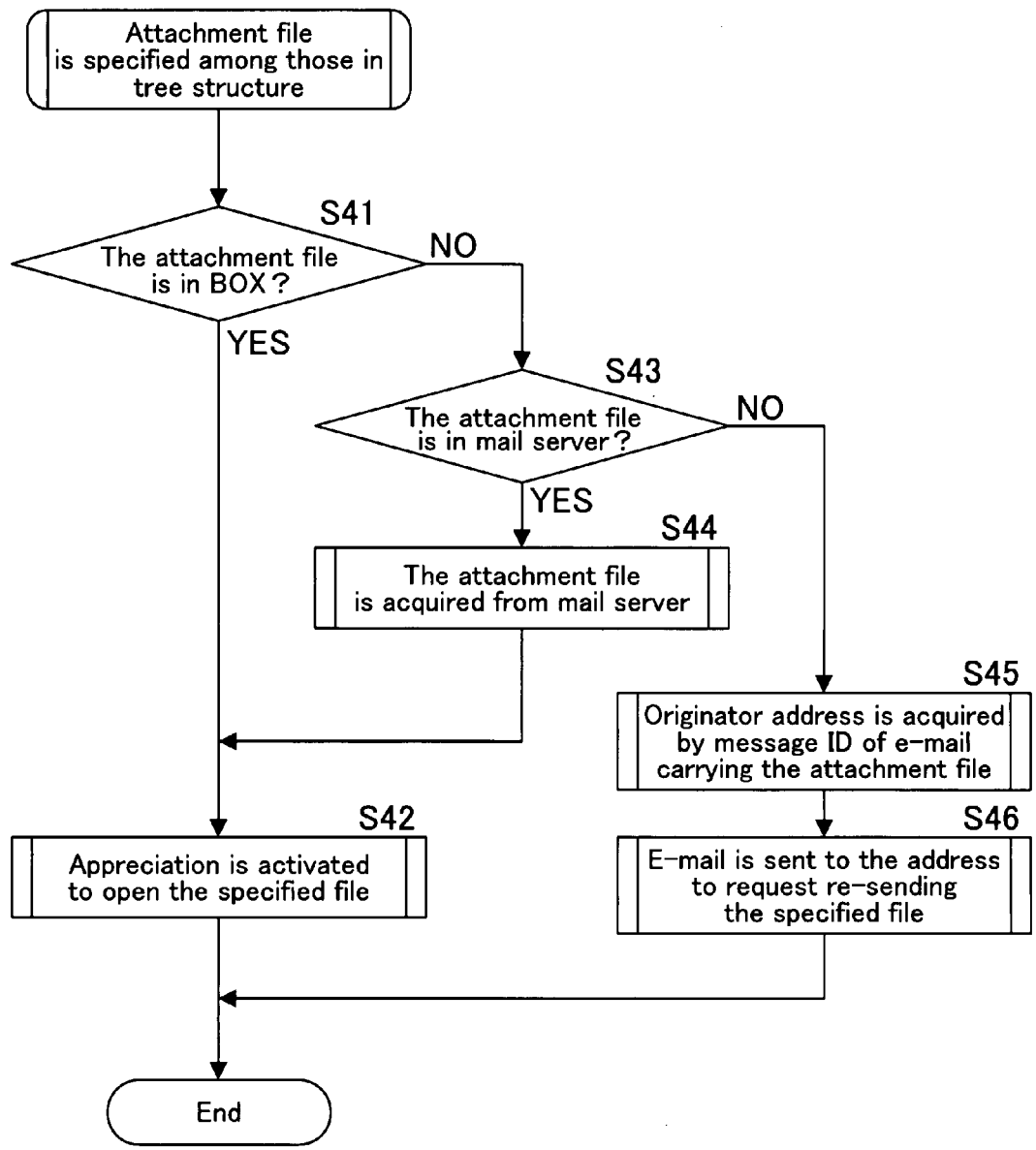
FIG. 22 is a flowchart of a process to request for an attachment file, by specifying the attachment file.

FIG. 22 shows a flowchart of a process to acquire an attachment file, by specifying the attachment file among those displayed in tree structure.

In FIG. 22, in Step S41, it is judged whether or not the attachment file is in the BOX. If the attachment file is in the BOX (YES in Step S24), then an application is activated to open the specified attachment file in Step S42, and the routine terminates.

If the attachment file is not in the BOX (NO in Step S24), it is judged in Step S43, whether or not the attachment file is in the mail server 31. If the attachment file is in the mail server 31 (YES in Step S43), the attachment file is acquired from the mail server 31 in Step S44, then the routine proceeds to Step S42.

If the attachment file is not in the mail server 31 (NO in Step S43), the mail address originating the attachment file is acquired by the message ID of the e-mail carrying the attachment file in Step S45, then in Step S46, an e-mail requesting to re-send the attachment file is sent to the acquired mail address originating the attachment file.

As explained above, in this embodiment, cross relationships between e-mails and attachment files of the past are displayed in tree structure. Thus, the e-mails and the attachment files of the past in the trees can be checked easily, and an attachment file can be tracked by checking those. In this way, a target file can be searched out easily.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An e-mail processing apparatus, comprising:
   a communication part that receives e-mails;
   an accumulator that accumulates said e-mails received via said communication part;
   a display; and
   a controller that makes said display display in a tree structure, cross relationships between said accumulated e-mails, based on past data of said accumulated e-mails,
   wherein said controller distinguishes between original attachment files and other attachment files, and makes said display display only emails having the original attachment files in the tree structure.

2. The e-mail processing apparatus as recited in claim 1, wherein said controller checks properties of the past attachment files, and removes from said accumulator the files that are duplicates of an original attachment file.

3. The e-mail processing apparatus as recited in claim 1, wherein each of the e-mails includes text, and wherein each of the original attachment files and the other attachment files includes data separate from the text of the email to which the original attachment file or the other attachment file is attached.

4. The e-mail processing apparatus as recited in claim 1, acquiring past data of said e-mails from header information of the e-mails.

5. The e-mail processing apparatus as recited in claim 1, wherein said e-mails displayed in the tree structure are those exchanged among a group.

6. An e-mail processing apparatus, comprising:
   a communication part that receives e-mails;
   an accumulator that accumulates said e-mails received via said communication part;
   a display; and
   a controller that makes said display display in a tree structure, cross relationships between said accumulated e-mails, based on past data of said accumulated e-mails,
   wherein said controller distinguishes between original attachment files and other attachment files, and makes said display display emails having the original attachment files in the tree structure in a form different from emails having duplicate attachment files.

7. The e-mail processing apparatus as recited in claim 6, wherein said controller makes the emails having duplicated attachment files displayed by serieses in a different form.

8. The e-mail processing apparatus as recited in claim 6, wherein each of the e-mails includes text, and wherein each of the original attachment files and the duplicate attachment files includes data separate from the text of the email to which the original attachment file or the duplicate attachment file is attached.

9. An e-mail processing apparatus, comprising:
   a communication part that receives e-mails;
   an accumulator that accumulates said e-mails received via said communication part;
   a display;
   an acquirer that acquires from a server, e-mails that are related to an optional e-mail selected by a user among said e-mails accumulated in said accumulator; and
   a controller that makes said display display in a tree structure, cross relationships between said acquired e-mails, wherein said controller distinguishes between original attachment files and other attachment files, and makes said display display only emails having the original attachment files in the tree structure.

10. The e-mail processing apparatus as recited in claim 9, wherein said acquirer acquires said related e-mails by header information of the related e-mails.

11. The e-mail processing apparatus as recited in claim 9, wherein each of said acquired e-mails includes the user who specified an e-mail at least as one from a sender and a recipient of the acquired e-mail.

12. The e-mail processing apparatus as recited in claim 9, wherein each of the e-mails includes text, and wherein each of the original attachment files and the other attachment files includes data separate from the text of the email to which the original attachment file or the other attachment file is attached.

13. An e-mail processing apparatus, comprising:
a communication part that receives e-mails;
an accumulator that accumulates said e-mails received via said communication part;
a display;
an acquirer that acquires from a server, e-mails that are related to an optional e-mail selected by a user among said e-mails accumulated in said accumulator; and
a controller that makes said display display in a tree structure, cross relationships between said acquired e-mails,
wherein said controller distinguishes between original attachment files and other attachment files, and makes said display display emails having the original attachment files in the tree structure and emails having attachment files that are duplicates of an original attachment file in different forms.

14. The e-mail processing apparatus as recited in claim 13, wherein each of the e-mails includes text, and wherein each of the original attachment files and the duplicate attachment files includes data separate from the text of the email to which the original attachment file or the duplicate attachment file is attached.

15. An e-mail processing method, comprising:
receiving e-mails;
accumulating said received e-mails;
making a display display in a tree structure, cross relationships between said accumulated e-mails, based on past data of said accumulated e-mails; and
distinguishing between original attachment files and other attachment files, and making a display display only emails having the original attachment files in the tree structure.

16. The e-mail processing method of claim 15, wherein each of the e-mails includes text, and wherein each of the original attachment files and the other attachment files includes data separate from the text of the email to which the original attachment file or the other attachment file is attached.

17. An e-mail processing method, comprising:
receiving e-mails;
accumulating said received e-mails;
acquiring from a server, e-mails that are related to an optional e-mail selected by a user among said accumulated e-mails; and
making a display display in a tree structure, cross relationships between said acquired e-mails; and
distinguishing between original attachment files and other attachment files, and making a display display only emails having the original attachment files in the tree structure.

18. The e-mail processing method of claim 17, wherein each of the e-mails includes text, and wherein each of the original attachment files and the other attachment files includes data separate from the text of the email to which the original attachment file or the other attachment file is attached.

19. A non-transitory computer readable medium encoded with a program for causing a computer to execute an e-mail processing method, comprising:
receiving e-mails;
accumulating said received e-mails;
making a display display in a tree structure, cross relationships between said accumulated e-mails, based on past data of said accumulated e-mails; and
distinguishing between original attachment files and other attachment files, and making a display display only emails having the original attachment files in the tree structure.

20. The non-transitory computer readable medium of claim 19, wherein each of the e-mails includes text, and wherein each of the original attachment files and the other attachment files includes data separate from the text of the email to which the original attachment file or the other attachment file is attached.

21. A non-transitory computer readable medium encoded with a program for causing a computer to execute an e-mail processing method, comprising:
receiving e-mails;
accumulating said received e-mails;
acquiring from a server, e-mails that are related to an optional e-mail selected by a user among said accumulated e-mails;
making a display display in a tree structure, cross relationships between said acquired e-mails; and
distinguishing between original attachment files and other attachment files, and making a display display only emails having the original attachment files in the tree structure.

22. The non-transitory computer readable medium of claim 21, wherein each of the e-mails includes text, and wherein each of the original attachment files and the other attachment files includes data separate from the text of the email to which the original attachment file or the other attachment file is attached.

* * * * *